United States Patent
Yang et al.

(10) Patent No.: US 11,816,038 B2
(45) Date of Patent: Nov. 14, 2023

(54) METHOD AND APPARATUS OF MAPPING TABLE RECONSTRUCTION BASED ON SSD, AND COMPUTER DEVICE

(71) Applicant: SHENZHEN UNIONMEMORY INFORMATION SYSTEM LIMITED, Shenzhen (CN)

(72) Inventors: Xuesen Yang, Shenzhen (CN); Jian Li, Shenzhen (CN); Longhua Qin, Shenzhen (CN); Jintao Gan, Shenzhen (CN); Weiliang Wang, Shenzhen (CN); Zongming Jia, Shenzhen (CN)

(73) Assignee: SHENZHEN UNIONMEMORY INFORMATION SYSTEM LIMITED, Guangdong (CN)

( * ) Notice: Subject to any disclaimer, the term of this patent is extended or adjusted under 35 U.S.C. 154(b) by 0 days.

(21) Appl. No.: 17/043,482

(22) PCT Filed: Feb. 28, 2020

(86) PCT No.: PCT/CN2020/077120
§ 371 (c)(1),
(2) Date: Sep. 29, 2020

(87) PCT Pub. No.: WO2021/056963
PCT Pub. Date: Apr. 1, 2021

(65) Prior Publication Data
US 2023/0131779 A1   Apr. 27, 2023

(30) Foreign Application Priority Data
Sep. 23, 2019 (CN) .......................... 201910899968.5

(51) Int. Cl.
   *G06F 12/1009* (2016.01)

(52) U.S. Cl.
   CPC .. *G06F 12/1009* (2013.01); *G06F 2212/1016* (2013.01)

(58) Field of Classification Search
   CPC .................................................. G06F 12/1009
   See application file for complete search history.

(56) References Cited

U.S. PATENT DOCUMENTS 4,949,326 A * 8/1990 Takagi ............... G11B 20/1883
                                                    369/53.17
9,218,280 B2   12/2015 Zhang et al.
(Continued)

FOREIGN PATENT DOCUMENTS

CN    103064641 A    4/2013
CN    103699341 A    4/2014
(Continued)

OTHER PUBLICATIONS

International Search Report for Application No. PCT/CN2020/077120.
(Continued)

*Primary Examiner* — Gary W. Cygiel
(74) *Attorney, Agent, or Firm* — CANTOR COLBURN LLP

(57) ABSTRACT

A method and an apparatus of mapping table reconstruction based on a SSD, and a computer device are disclosed by the present application, and the method includes: acquiring the mapping table reconstruction request based on the SSD; scanning starting from the last physical page of the corresponding physical block according to the mapping table reconstruction request based on the SSD; reading the corresponding logical address and N logical address offsets from a data area of the current physical page, where N is the positive integer greater than 1; acquiring logical addresses corresponding to N adjacent pages in sequence according to the logical address corresponding to the current physical
(Continued)

page and the N logical address offsets; reconstructing a mapping relationship between logical addresses and physical addresses according to the logical address corresponding to the current physical page and the logical addresses corresponding to the N adjacent pages.

12 Claims, 4 Drawing Sheets

(56) References Cited

U.S. PATENT DOCUMENTS

| | | | |
|---|---|---|---|
| 10,635,525 B2 | 4/2020 | Chen et al. | |
| 2015/0261617 A1 | 9/2015 | Choi et al. | |
| 2018/0267827 A1* | 9/2018 | Kanno | G06F 1/30 |
| 2019/0087284 A1* | 3/2019 | Kim | G06F 11/1441 |

FOREIGN PATENT DOCUMENTS

| | | |
|---|---|---|
| CN | 103744795 A | 4/2014 |
| CN | 103902406 A | 7/2014 |
| CN | 105224478 A | 1/2016 |
| CN | 107562644 A | 1/2018 |
| CN | 108153681 A | 6/2018 |
| CN | 108733510 A | 11/2018 |
| CN | 108804026 B | 11/2018 |
| CN | 110704337 A | 1/2020 |

OTHER PUBLICATIONS

First Office Action dated Jul. 3, 2020; Chinese Application No. 201910899968.5; 3 pages (non-English).
First Office Action dated Jul. 3, 2020; Chinese Application No. 201910899968.5; 4 pages (English).
International Search Report dated Jun. 28, 2020; International Application No. PCT/CN2020/077120; 2 pages (English).
Search Report dated Jun. 29, 2020; Chinese Application No. CN201910899968.5; 1 page.
Supplemental Search Report dated Dec. 8, 2020; Chinese Application No. CN201910899968.5; 1 page.
Written Opinion dated Jun. 28, 2020; International Application No. PCT/CN2020/077120; 4 pages (English).
Written Opinion dated Jun. 28, 2020; International Application No. PCT/CN2020/077120; 4 pages (non-English).

* cited by examiner

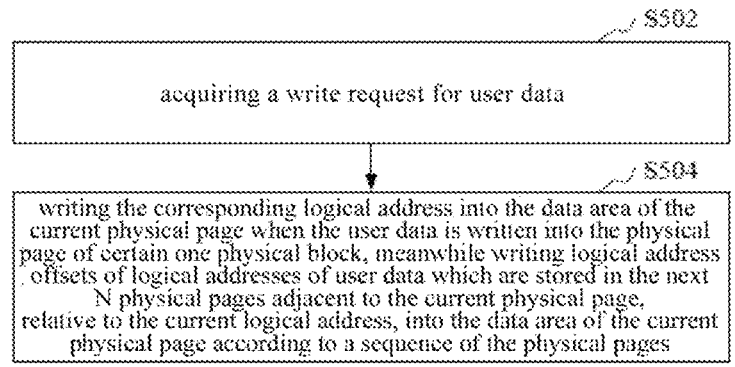
FIG. 5
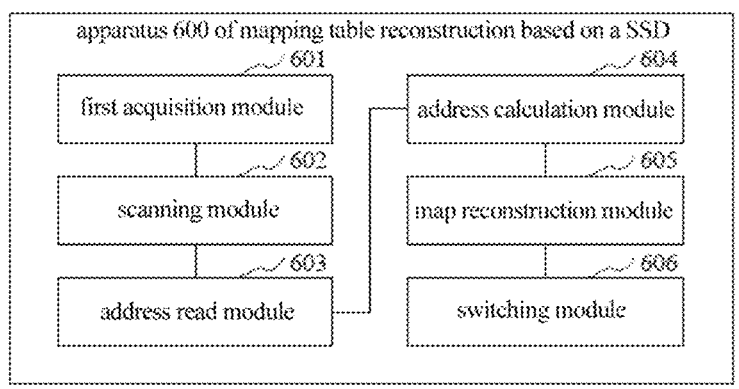
FIG. 6
FIG. 7

METHOD AND APPARATUS OF MAPPING TABLE RECONSTRUCTION BASED ON SSD, AND COMPUTER DEVICE

CROSS REFERENCE TO RELATED APPLICATIONS

The present application is a National Stage National Stage of PCT Application No. PCT/CN2020/077120 filed on Feb. 28, 2020, which claims priority of the Chinese Patent Application No. 201910899968.5 filed at the Chinese Patent Office on Sep. 23, 2019, and entitled "a method and an apparatus of mapping table reconstruction based on a SSD, and a computer device", the contents each of which are incorporated herein by reference in their entity.

TECHNICAL FIELD

The present application relates to the field of SSD technologies, and particularly to a method and an apparatus of mapping table reconstruction based on a SSD, and a computer device.

BACKGROUND

At present, within a SSD (Solid State Drive), the mapping from a logical address or space to a physical address or space forms a mapping table. Each mapping relationship in the mapping table has recorded the mapping from the logical address of the user data to the physical address. If the mapping table is damaged or lost due to some abnormal reasons, then the mapping relationship between the logical address of the user data and the physical address cannot be found, and the corresponding user data cannot be found either. Therefore, a method is needed to find user data even when the mapping table is lost.

In a traditional technology, in order to find the user data even when the mapping table is lost, the logical address of the user data is recorded in a spare area of a physical page when writing the user data. If the mapping table is lost, the spare area of the physical page is scanned and read to obtain the logical address information, and then the mapping relationship between the logical address and the physical address is re-established, and the complete mapping table is established after scanning the complete SSD. It can be seen that, according to the traditional method, it is necessary to scan the entire SSD to read the data of each physical page of each physical block. Assuming that one SSD is provided with 200 physical blocks and each physical block is provided with 80 physical pages, and the spare are of each physical page can only store one logical address, then a total of 16000 (200*80=16000) times of read operations are required to scan the entire SSD. The more the times of read operations, the more time it takes, thereby the process of reconstructing the mapping table takes a lot of time.

Technical Problem

One purpose of embodiments of the present application is to provide a method and an apparatus of mapping table reconstruction based on a SSD, as well as a computer device, which are aimed at solving the problem that the process of reconstructing the mapping table in the SSD takes a lot of time.

SUMMARY

In order to solve the above technical problem, the technical solutions adopted by embodiments of the present application are as follows.

A first aspect, a method of mapping table reconstruction based on a SSD is provided, which includes:
acquiring a mapping table reconstruction request based on the SSD;
scanning starting from a last physical page of a corresponding physical block according to the mapping table reconstruction request based on the SSD;
reading a corresponding logical address and N logical address offsets from a data area of the current physical page, where N is a positive integer greater than 1;
acquiring logical addresses corresponding to N adjacent pages in sequence according to the logical address corresponding to the current physical page and the N logical address offsets;
reconstructing a mapping relationship between logical addresses and physical addresses according to the logical address corresponding to the current physical page and the logical addresses corresponding to the N adjacent pages.

A second aspect, an apparatus of mapping table reconstruction based on a SSD is provided, which includes:
a first acquisition module, configured to acquire a mapping table reconstruction request based on the SSD;
a scanning module, configured to scan starting from a last physical page of a corresponding physical block according to the mapping table reconstruction request based on the SSD;
an address read module, configured to read a corresponding logical address and N logical address offsets from a data area of the current physical page, where N is a positive integer greater than 1;
an address calculation module, configured to acquire logical addresses corresponding to N adjacent pages in sequence according to the logical address corresponding to the current physical page and the N logical address offsets;
a map reconstruction module, configured to reconstruct a mapping relationship between logical addresses and physical addresses according to the logical address corresponding to the current physical page and the logical addresses corresponding to the N adjacent pages.

A third aspect, a computer device is provided, which includes a memory, a processor, and a computer program stored in the memory and executable by the processor. The processor, when executing the computer program, implements the steps of the method of mapping table reconstruction based on the SSD described in the first aspect.

A fourth aspect, a computer-readable storage medium on which a computer program is stored is provided. The computer program, when executed by the processor, implements the steps of the method of mapping table reconstruction based on the SSD described in the first aspect.

The beneficial effects of the method and the apparatus of mapping table reconstruction based on the SSD, and the computer device provided by the present application lie in that: in the present application, through acquiring the mapping table reconstruction request based on the SSD; scanning starting from the last physical page of the corresponding physical block according to the mapping table reconstruction request based on the SSD; reading the corresponding logical address and N logical address offsets from a data area of the current physical page, where N is the positive integer greater than 1; acquiring logical addresses corresponding to N adjacent pages in sequence according to the logical address corresponding to the current physical page and the N logical address offsets; so that the mapping relationship between the logical addresses and the physical addresses is reconstructed according to the logical address corresponding to the current physical page and the logical addresses corresponding to the N adjacent pages. In the present application, the data area of the physical page in the physical block of the NAND Flash is used to store its own logical address and the offsets of several adjacent physical pages relative to this logical address, so that the times of full scan for the SSD can be reduced by using this method when the mapping table inside the SSD is lost, thereby achieving the purpose of quick reconstruction of the mapping table.

DESCRIPTION OF THE DRAWINGS

FIG. 5 is a schematic flowchart of the method of mapping table reconstruction based on a SSD in yet another embodiment.

FIG. 6 is a structural block diagram of the apparatus of mapping table reconstruction based on a SSD in an embodiment.

FIG. 7 is a structural block diagram of the apparatus of mapping table reconstruction based on a SSD in another embodiment.

EMBODIMENTS OF THE APPLICATION

In order to make the purpose, technical solutions, and advantages of the present application more comprehensible, the present application will be further described in detail with reference to the accompanying drawings and embodiments. It should be understood that the specific embodiments described herein are only used to explain the present application, and not used to limit the present application.

NAND Flash is composed of many blocks (physical blocks), and each block is composed of many physical pages. Each physical page is provided with two storage areas, i.e., one data area and one spare area, and the SSD firmware determines data stored in these two areas. Generally, the SSD firmware will store user data in the data area; and a logical address corresponding to the user data is stored in the spare area of the physical page. Due to the limited storage space of the spare area of the physical page, it cannot store too much data. Normally, the spare area of the physical page only stores the logical address corresponding to the user data stored in the physical page.

In a traditional technology, when user data is written into the physical page of certain one physical block, the mapping relationship between its logical address and the physical address is established, and the mapping table is updated. At the same time, its logical address is written into the spare area of this physical page. However, due to abnormal conditions, the mapping table inside the SSD is lost, and the firmware needs to perform a full scan for the SSD in order to reconstruct the entire mapping table. During the full scan for the SSD, each physical page of each physical block is read, the logical address corresponding to this physical page is acquired from the spare area of the physical page, thus the mapping relationship between the logical address and the physical address is established and the mapping relationship is recorded in the mapping table. When the full scan for the SSD ends, all mapping relationships have been established, and the mapping table reconstruction is completed. For example, assuming that one SSD has 200 physical blocks and each physical block has 80 physical pages, and the spare area of each physical page only stores one logical address based on the traditional practice, and then the full scan for the SSD requires 16000 (200*80=16000) times of read operations in total, and the more the times of read operations, the more time it takes.

In view of the problem existed in the above-mentioned traditional technology, the present application is aimed to provide a method of mapping table reconstruction based on a SSD, which can greatly reduce the times of scan operations, thereby reducing the times of full scan for the SSD.

Figure 1:
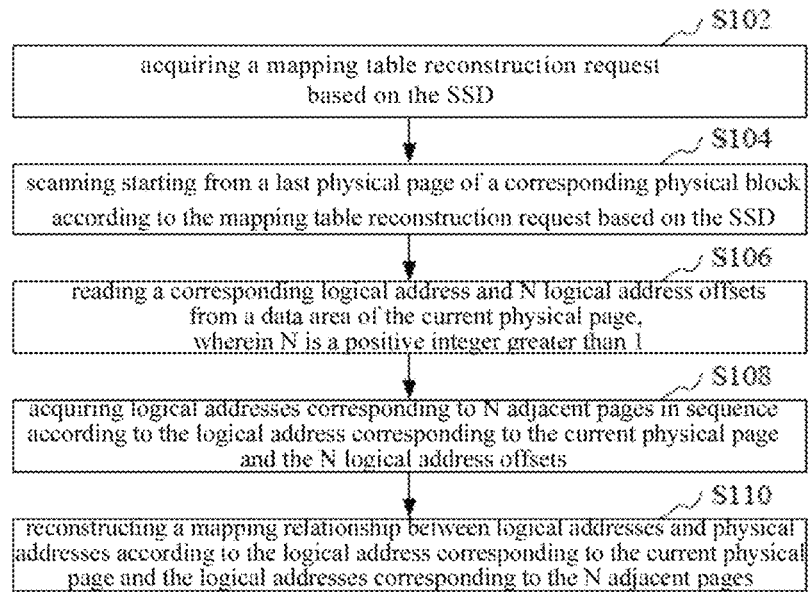
FIG. 1 is a schematic flowchart of the method of mapping table reconstruction based on a SSD in an embodiment.

In an embodiment as shown in FIG. 1, a method of mapping table reconstruction based on a SSD is provided, and the method includes:

at step 102, acquiring a mapping table reconstruction request based on the SSD;

at step 104, scanning starting from a last physical page of a corresponding physical block according to the mapping table reconstruction request based on the SSD;

at step 106, reading a corresponding logical address and N logical address offsets from a data area of the current physical page, where N is a positive integer greater than 1;

at step 108, acquiring logical addresses corresponding to N adjacent pages in sequence according to the logical address corresponding to the current physical page and the N logical address offsets;

at step 110, reconstructing a mapping relationship between logical addresses and physical addresses according to the logical address corresponding to the current physical page and the logical addresses corresponding to the N adjacent pages.

In this embodiment, since the spare area of the physical page is limited in size and can only store one logical address, this embodiment proposes to use the data area of the physical page to store the logical address of the current physical page and the offsets of the adjacent physical pages relative to the logical address of the current page, thereby reducing the times of full scan for the SSD and thus achieving the purpose of rapid reconstruction of the mapping table.

Specifically, the mapping table reconstruction request based on the SSD is firstly acquired, and the scanning is started from the last physical page of the corresponding physical block according to this request. Then, the logical address stored in this physical page is acquired by scanning this physical page, and at the same time the logical addresses stored in several adjacent physical pages are also acquired. In this way, not only the logical address corresponding to the current physical address is found, but also the logical addresses corresponding to the adjacent physical addresses are found, such that multiple mapping relationships are established and there is no need to scan the several adjacent physical pages, thereby reducing the times of scans. Due to the limited storage space of the spare area of the physical page, only one logical address can be stored, which obviously cannot meet the demand. In contrast, the space of the data area of the physical page is large, which can store the logical address of the current physical page and the offsets of the adjacent physical pages relative to the logical address of the current page, since the logical address of the current page plus the offset is equal to the logical address of the adjacent page. In this way, the logical addresses of the current page and the adjacent pages are acquired at one time, which achieves the purpose of reducing the times of full scan for the SSD and reconstructing the mapping table rapidly.

In an embodiment, the step of acquiring the logical addresses corresponding to the N adjacent pages in sequence according to the logical address corresponding to the current physical page and the N logical address offsets further includes: calculating sum of the logical address corresponding to the current physical page and the N logical addresses offsets respectively to acquire the logical addresses corresponding to the N adjacent pages.

Figure 2:
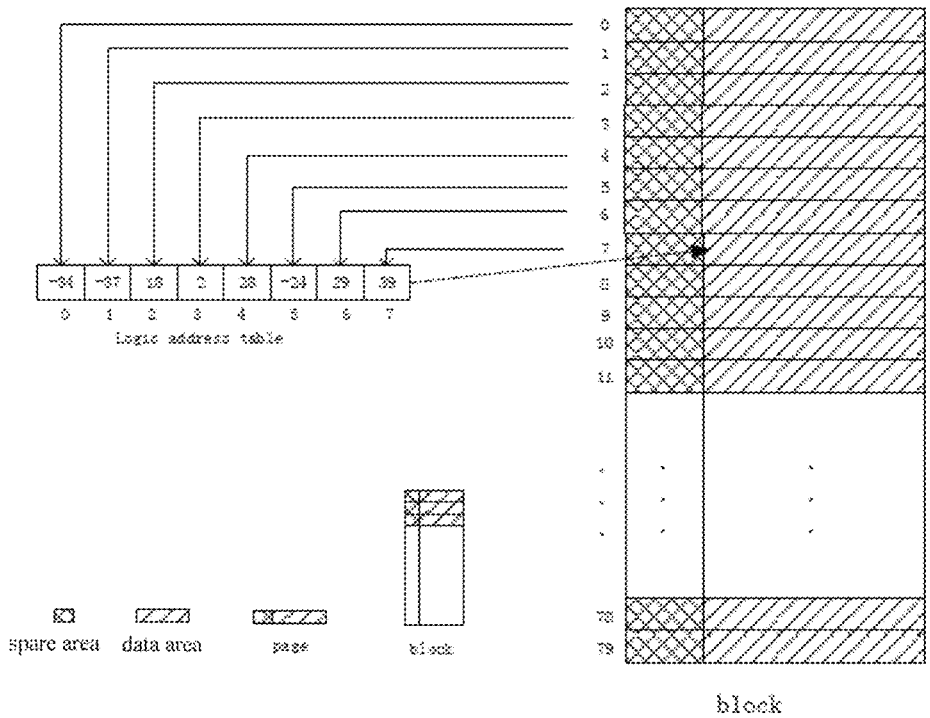
FIG. 2 is a schematic diagram of storing logical addresses in a data area of a physical page in an embodiment.

Specifically, that the data area of each physical page stores one logical address and the offset is equal to seven is taken as an example for detailed description. When the user data is written into the physical page of certain one physical block of the NAND Flash, the logical address of the user data is written into the data area of this physical page, and at the same time the offsets of the logical addresses of the user data, stored in the next seven physical pages of this physical block adjacent to this physical page, relative to the current logical address are also written into the data area of the current physical page according to the sequence of the physical pages. In this way, the current physical page stores one logical address and seven offsets: the logical address corresponding to the current physical page, and the offsets relative to the logical address of the current page which is transformed by the logical addresses of the next seven physical pages adjacent to this physical page. As shown in FIG. 2, the seventh physical page of certain one physical block not only stores its own corresponding logical address 39, but also stores the offsets of the physical pages from 6 to 0 relative to the logical address 37 in turn backward, such as 29, −24, 28, 2, 18, −37, −34, etc. The actual logical addresses of the physical pages from 6 to 0 are 68, 15, 67, 41, 57, 2, 5, etc., respectively. The logical address of the current page plus the offsets of the adjacent pages are equal to the actual logical addresses of the adjacent pages.

Figure 3:
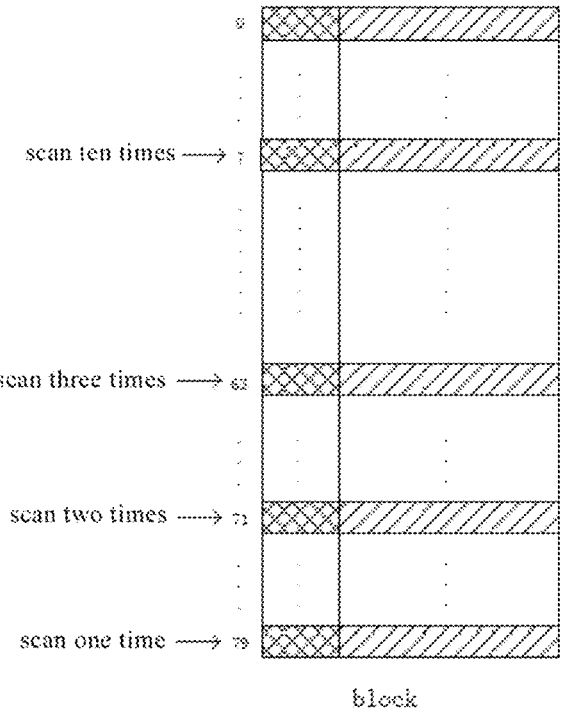
FIG. 3 is a schematic diagram of scanning physical blocks and reconstructing the mapping table in an embodiment.

If the mapping table is lost, a full scan for the SSD is required to restore the mapping table. The scan is started from the last physical page of each physical block, and one logical address and seven offsets will be acquired every time one physical page is scanned. This logical address is the logical address corresponding to the current physical page, and the seven offsets are offsets of the current page relative to the next seven pages. The logical address plus the offsets are equal to the logical addresses of the next seven pages. In this way, eight mapping relationships between the logical addresses and the physical addresses are established, and the eighth pages backward from the current physical page serves as the next scan page as shown in FIG. 3. In this way, the times of scans are only ⅛ of that of a general method. Assuming again that one SSD has 200 physical blocks and each physical block has 80 physical pages, then each physical block only needs to be scanned 10 (80/8=10) times, and the entire SSD only needs to be scanned 2000 (200*10=2000) times, which is far smaller than the 16000 times of scans in the general method. The times of scans are reduced, so that the time for full scan for the SSD is reduced accordingly.

In the above embodiment, through acquiring the mapping table reconstruction request based on the SSD; scanning starting from the last physical page of the corresponding physical block according to the mapping table reconstruction request based on the SSD; reading the corresponding logical address and N logical address offsets from a data area of the current physical page, where N is the positive integer greater than 1; acquiring logical addresses corresponding to N adjacent pages in sequence according to the logical address corresponding to the current physical page and the N logical address offsets; so that the mapping relationship between the logical address and the physical address is reconstructed according to the logical address corresponding to the current physical page and the logical addresses corresponding to the N adjacent pages. In this embodiment, the data area of the physical page in the physical block of the NAND Flash is used to store its own logical address and the offsets of several adjacent physical pages relative to this logical address, so that the times of full scan for the SSD can be reduced by using this method when the mapping table inside the SSD is lost, thereby achieving the purpose of quick reconstruction of the mapping table.

In an embodiment as shown in FIG. 3, a method of mapping table reconstruction based on a SSD is provided, and the method includes:

- at step 402, acquiring a mapping table reconstruction request based on the SSD;
- at step 404, scanning starting from a last physical page of a corresponding physical block according to the mapping table reconstruction request based on the SSD;
- at step 406, reading a corresponding logical address and N logical address offsets from a data area of the current physical page, where N is a positive integer greater than 1;
- at step 408, acquiring logical addresses corresponding to N adjacent pages in sequence according to the logical address corresponding to the current physical page and the N logical address offsets;
- at step 410, reconstructing a mapping relationship between logical addresses and physical addresses according to the logical address corresponding to the current physical page and the logical addresses corresponding to the N adjacent pages;
- at step 412, determining a (N+1)th page backward from the current physical page as a next physical page to be scanned.

In this embodiment, if the mapping table is lost, a full scan for the SSD is required to restore the mapping table. The scan is started from the last physical page of each physical block, and one logical address and N offsets will be acquired every time one physical page is scanned. This logical address is the logical address corresponding to the current physical page, and the N offsets are offsets of the current page relative to the next N pages. The logical address plus the offsets are equal to the logical addresses of the next N pages. In this way, N+1 mapping relationships between the logical addresses and the physical addresses are established. Finally, the (N+1)th page backward from the current physical page is determined as the next physical page to be scanned, thereby greatly reducing the times of scans for the physical pages.

Specifically, as shown in FIG. 3, the times of scans are only ⅛ of that of the traditional method. Assuming that one SSD has 200 physical blocks and each physical block has 80 physical pages, then each physical block only needs to be scanned 10 (80/8=10) times, and the entire SSD only needs to be scanned 2000 (200*10=2000) times, which is far smaller than the 16000 times of scans in the general method. The times of scans are reduced, so that the time for full scan for the SSD is reduced accordingly.

In an embodiment as shown in FIG. 5, the method of mapping table reconstruction based on the SSD is provided, and the method, before the step of acquiring the mapping table reconstruction request based on the SSD, further includes:

at step 502, acquiring a write request for user data;

at step 504, writing the corresponding logical address into the data area of the current physical page when the user data is written into the physical page of certain one physical block, meanwhile writing logical address offsets of logical addresses of user data which are stored in the next N physical pages adjacent to the current physical page, relative to the current logical address, into the data area of the current physical page according to a sequence of the physical pages.

In this embodiment, when the user data is written into the physical page of certain one physical block of the NAND Flash, the logical address of the user data is written into the data area of this physical page, and at the same time the offsets of the logical addresses of user data which are stored in the next N physical pages of this physical block adjacent to this physical page, relative to the current logical address, are written into the data area of this current physical page according to the sequence of the physical pages. In this way, the current physical page stores one logical address and N offsets: the logical address corresponding to the current physical page, and the offsets relative to the logical address of the current page transformed by the logical addresses of the next N physical pages adjacent to this physical page.

Specifically, for example, the seventh physical page of certain one physical block as shown in FIG. 2 not only stores its own corresponding logical address 39, but also stores seven offsets of the physical pages from 6 to 0 relative to logical address 37 in turn backward, such as 29, −24, 28, 2, 18, −37, −34, etc. The actual logical addresses of the physical pages from 6 to 0 are 68, 15, 67, 41, 57, 2, 5, etc., respectively. The logical address of the current page plus the offsets of the adjacent pages are equal to the actual logical addresses of the adjacent pages.

Figure 4:
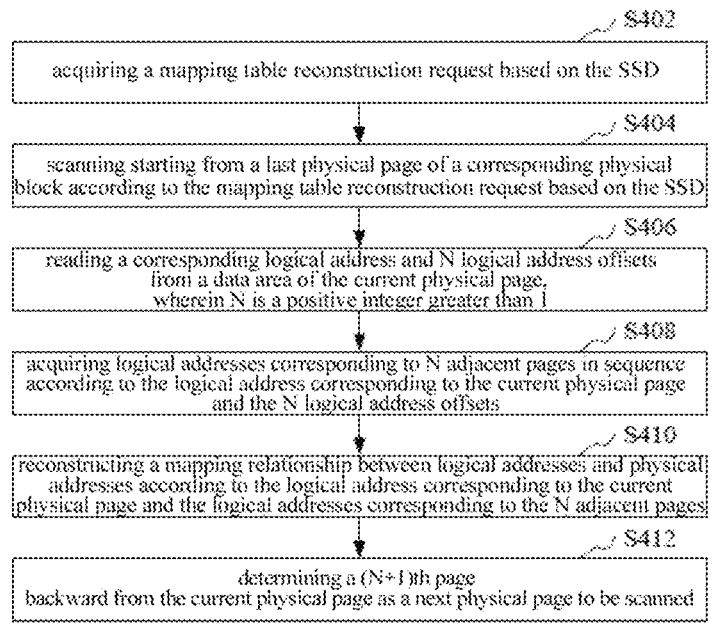
FIG. 4 is a schematic flowchart of the method of mapping table reconstruction based on a SSD in another embodiment.

It should be understood that, although the steps in the flowcharts of FIGS. 3-5 are shown in sequence as indicated by the arrows, these steps are not necessarily executed in the sequence indicated by the arrows. Unless specifically stated herein, the execution of these steps is not strictly limited by the sequence, and these steps can be executed in other sequence. Moreover, at least some of the steps in FIGS. 3-5 may include a plurality of sub-steps or a plurality of stages. These sub-steps or stages are not necessarily executed at the same time, but can be executed at different times. The execution sequence of these sub-steps or stages is not necessarily performed sequentially, but may be performed successively or alternately together with other steps or at least a part of sub-steps or stages of other steps.

In an embodiment as shown in FIG. 6, an apparatus 600 of mapping table reconstruction based on a SSD is provided, and the apparatus includes:

a first acquisition module 601 configured to acquire a mapping table reconstruction request based on the SSD;

a scanning module 602 configured to scan starting from a last physical page of a corresponding physical block according to the mapping table reconstruction request based on the SSD;

an address read module 603 configured to read a corresponding logical address and N logical address offsets from a data area of the current physical page, where N is a positive integer greater than 1;

an address calculation module 604 configured to acquire logical addresses corresponding to N adjacent pages in sequence according to the logical address corresponding to the current physical page and the N logical address offsets;

a map reconstruction module 605 configured to reconstruct a mapping relationship between logical addresses and physical addresses according to the logical address corresponding to the current physical page and the logical addresses corresponding to the N adjacent pages.

In an embodiment as shown in FIG. 7, the apparatus of mapping table reconstruction based on the SSD is provided, and the apparatus further includes:

a switching module 606 configured to determine a (N+1) th page backward from the current physical page as a next physical page to be scanned.

Figure 8:
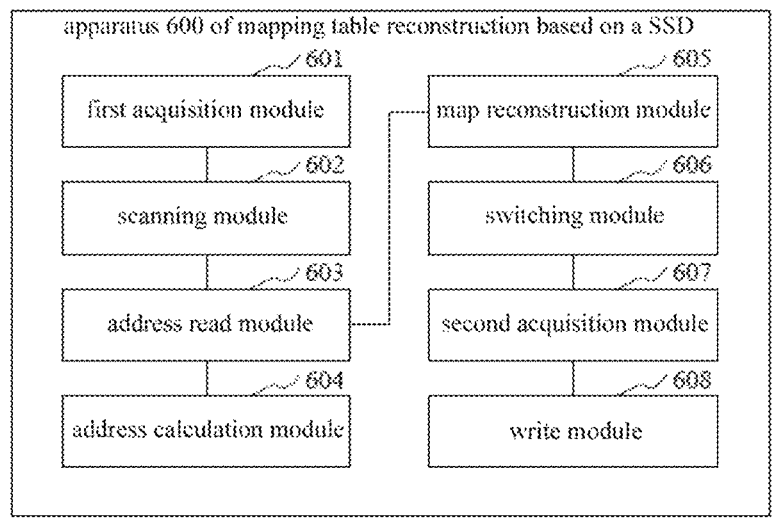
FIG. 8 is a structural block diagram of the apparatus of mapping table reconstruction based on a SSD in yet another embodiment.

In an embodiment as shown in FIG. 8, the apparatus of mapping table reconstruction based on the SSD is provided, and the apparatus further includes:

a second acquisition module 607 configured to acquire a write request for user data;

a write module 608 configured to write the corresponding logical address into the data area of the current physical page when the user data is written into the physical page of certain one physical block, meanwhile write logical address offsets of logical addresses of user data which are stored in the next N physical pages adjacent to the current physical page, relative to the current logical address, into the data area of the current physical page according to a sequence of the physical pages.

In an embodiment, the address calculation module 604 is further configured to:

calculating sum of the logical address corresponding to the current physical page and the offsets of the N logical addresses respectively to acquire the logical addresses corresponding to the N adjacent pages sequentially.

Regarding the specific limitations on the apparatus of mapping table reconstruction based on the SSD, reference may be made to the limitation on the method of mapping table reconstruction based on the SSD, which is not repeated herein.

Figure 9:
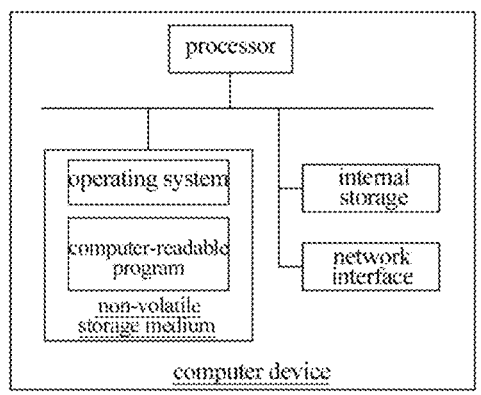
FIG. 9 is an internal structure diagram of the computer device in an embodiment.

In an embodiment, a computer device is provided, and its internal structure diagram may be as shown in FIG. 9. The computer device includes a processor, a memory, and a network interface connected through a bus of the device. Among them, the processor of the computer device is configured to provide calculation and control capabilities. The memory of the computer device includes a non-volatile storage medium and an internal storage. The non-volatile storage medium stores an operating apparatus, a computer program, and a database. The internal storage provides an operation environment for the operating apparatus and the computer program in the non-volatile storage medium. The network interface of the computer device is configured to communicate with an external terminal through a network connection. The computer program, when executed by the processor, implements the method of mapping table reconstruction based on the SSD.

Those skilled in the art can understand that the structure as shown in FIG. 9 is only a block diagram of a part of the structure related to the solution of the present application, and does not constitute a limitation on the computer device on which the solution of the present application is applied. The specific computer device may include more or fewer parts than shown in the figure, or combine some parts, or be provided with a different arrangement of parts.

In an embodiment, a computer device is provided, which includes a memory, a processor, and a computer program stored in the memory and executable by the processor. The processor, when executing the computer program, implements the steps of the embodiments of the above-mentioned methods.

In an embodiment, a computer-readable storage medium is provided, on which a computer program is stored, and the computer program, when executed by a processor, implements the steps of the embodiments of the above-mentioned methods.

Those of ordinary skill in the art can understand that all or part of the processes in the embodiments of the above-mentioned methods may be implemented by relevant hardware through instruction of a computer program. The computer program may be stored in a readable storage medium of a non-volatile computer, and when the computer program is executed, it may include the procedures of the embodiments of the above-mentioned methods. Here, any reference to the memory, the storage, the database, or other medium used in the embodiments provided in the present application may include non-volatile and/or volatile storage. The non-volatile storage may include read-only memory (ROM), programmable ROM (PROM), electrically programmable ROM (EPROM), electrically erasable programmable ROM (EEPROM), or flash memory. The volatile memory may include random access memory (RAM) or external cache memory. As an illustration and not a limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus dynamic RAM (RDRAM), a direct rambus dynamic RAM (DRDRAM), and a rambus dynamic RAM (RDRAM), etc.

The technical features of the above embodiments can be combined arbitrarily. In order to make the description concise, all possible combinations of the technical features in the above embodiments are not described. However, as long as there is no contradiction between the combinations of these technical features, they should be considered as in the range described in this specification.

The above-mentioned embodiments only describe several implementations of the present application, and the description is relatively specific and detailed, but it should not be understood as a limitation on the scope of the present application. It should be pointed out that several modifications and improvements can be made without departing from the concept of the present application for those of ordinary skill in the art, and these modifications and improvements fall within the protection scope of the present application. Therefore, the protection scope of the present application shall be subject to the appended claims.

What is claimed is:

1. A method of mapping table reconstruction based on a SSD, comprising:
   acquiring a mapping table reconstruction request based on the SSD;
   scanning starting from a last physical page of a corresponding physical block according to the mapping table reconstruction request based on the SSD;
   reading a corresponding logical address and N logical address offsets from a data area of the last physical page, wherein the last physical page is a current physical page selected for scanning, and wherein N is a positive integer greater than 1;
   acquiring logical addresses corresponding to N adjacent pages in sequence according to the logical address corresponding to the current physical page and the N logical address offsets;
   reconstructing a mapping relationship between logical addresses and physical addresses according to the logical address corresponding to the current physical page and the logical addresses corresponding to the N adjacent pages.

2. The method of mapping table reconstruction according to claim 1, wherein the method, after reconstructing the mapping relationship between the logical addresses and the physical addresses according to the logical address corresponding to the current physical page and the logical addresses corresponding to the N adjacent pages, further comprises:
   determining a (N+1)th page backward from the current physical page as a next physical page to be scanned.

3. The method of mapping table reconstruction according to claim 1, wherein the method, before acquiring the mapping table reconstruction request based on the SSD, further comprises:
   acquiring a write request for user data;
   writing the corresponding logical address into the data area of an identified physical page selected to store logical address information when the user data is written into a target physical page associated with the write request, meanwhile writing logical address offsets of logical addresses of user data which are stored in the next N physical pages adjacent to the current physical page, relative to the current logical address, into the data area of the current physical page according to a sequence of the physical pages.

4. The method of mapping table reconstruction according to claim 1, wherein the step of acquiring the logical addresses corresponding to the N adjacent pages in sequence according to the logical address corresponding to the current physical page and the N logical address offsets further includes:
   calculating sum of the logical address corresponding to the current physical page and the N logical addresses offsets respectively to acquire the logical addresses corresponding to the N adjacent pages.

5. An apparatus of mapping table reconstruction based on a SSD, comprising:
   a first acquisition module, configured to acquire a mapping table reconstruction request based on the SSD;
   a scanning module, configured to scan starting from a last physical page of a corresponding physical block according to the mapping table reconstruction request based on the SSD;
   an address read module, configured to read a corresponding logical address and N logical address offsets from a data area of the last physical page, wherein the last physical page is a current physical page selected for scanning, and wherein N is a positive integer greater than 1;
   an address calculation module, configured to acquire logical addresses corresponding to N adjacent pages in sequence according to the logical address corresponding to the current physical page and the N logical address offsets;
   a map reconstruction module, configured to reconstruct a mapping relationship between logical addresses and physical addresses according to the logical address corresponding to the current physical page and the logical addresses corresponding to the N adjacent pages.

6. The apparatus of mapping table reconstruction according to claim 5, wherein the apparatus further comprises:
a switching module, configured to determine a (N+1)th page backward from the current physical page as a next physical page to be scanned.

7. The apparatus of mapping table reconstruction according to claim 5, wherein the apparatus further comprises:
a second acquisition module, configured to acquire a write request for user data;
a write module, configured to write the corresponding logical address into the data area of an identified physical page selected to store logical address information when the user data is written into a target physical page associated with the write request, meanwhile write logical address offsets of logical addresses of user data which are stored in the next N physical pages adjacent to the current physical page, relative to the current logical address, into the data area of the current physical page according to a sequence of the physical pages.

8. The apparatus of mapping table reconstruction according to claim 5, wherein the address calculation module is further configured to:
calculating sum of the logical address corresponding to the current physical page and the offsets of the N logical addresses respectively to acquire the logical addresses corresponding to the N adjacent pages sequentially.

9. A computer device, comprising a memory, a processor, and a computer program stored in the memory and executable by the processor, wherein the processor, when executing the computer program, implements the steps of:
acquiring a mapping table reconstruction request based on the SSD;
scanning starting from a last physical page of a corresponding physical block according to the mapping table reconstruction request based on the SSD;
reading a corresponding logical address and N logical address offsets from a data area of the last physical page, wherein the last physical page is a current physical page selected for scanning, and wherein N is a positive integer greater than 1;
acquiring logical addresses corresponding to N adjacent pages in sequence according to the logical address corresponding to the current physical page and the N logical address offsets;
reconstructing a mapping relationship between logical addresses and physical addresses according to the logical address corresponding to the current physical page and the logical addresses corresponding to the N adjacent pages.

10. The computer device according to claim 9, wherein the processor, when executing the computer program, further implements the steps of:
determining a (N+1)th page backward from the current physical page as a next physical page to be scanned.

11. The computer device according to claim 9, wherein the processor, when executing the computer program, further implements the steps of:
acquiring a write request for user data;
writing the corresponding logical address into the data area of an identified physical page selected to store logical address information when the user data is written into a target physical page associated with the write request, meanwhile writing logical address offsets of logical addresses of user data which are stored in the next N physical pages adjacent to the current physical page, relative to the current logical address, into the data area of the current physical page according to a sequence of the physical pages.

12. The computer device according to claim 9, wherein the processor, when executing the computer program, further implements the steps of:
calculating sum of the logical address corresponding to the current physical page and the N logical addresses offsets respectively to acquire the logical addresses corresponding to the N adjacent pages.

* * * * *